United States Patent [19]

Fuchs

[11] Patent Number: 4,827,445
[45] Date of Patent: May 2, 1989

[54] IMAGE BUFFER HAVING LOGIC-ENHANCED PIXEL MEMORY CELLS AND METHOD FOR SETTING VALUES THEREIN

[75] Inventor: Henry Fuchs, Pittsboro, N.C.

[73] Assignee: University of North Carolina, Chapel Hill, N.C.

[21] Appl. No.: 856,208

[22] Filed: Apr. 28, 1986

Related U.S. Application Data

[62] Division of Ser. No. 349,818, Feb. 18, 1982, Pat. No. 4,590,465.

[51] Int. Cl.⁴ .......................... G06F 3/00; G06F 3/03; G06F 15/66
[52] U.S. Cl. ..................... 364/900; 340/750
[58] Field of Search ... 364/200 MS File, 900 MS File; 340/750, 798, 799, 800, 801; 365/49

[56] References Cited

U.S. PATENT DOCUMENTS

| | | | |
|---|---|---|---|
| 3,441,789 | 4/1969 | Harrison, III | 315/18 |
| 3,454,822 | 7/1969 | Harrison, III | 315/378 |
| 3,473,160 | 10/1969 | Wahlstrom | 364/900 |
| 3,523,289 | 8/1970 | Harrison, III | 340/747 |
| 3,585,628 | 6/1971 | Harrison, III | 340/725 |
| 3,602,702 | 8/1971 | Warnock | 235/151 |
| 3,603,964 | 9/1971 | Harrison, III | 340/725 |
| 3,639,736 | 2/1972 | Sutherland | 235/152 |
| 3,665,408 | 5/1972 | Erdahl et al. | 340/729 |
| 3,684,876 | 8/1972 | Sutherland | 235/168 |
| 3,700,792 | 10/1972 | Harrison, III | 178/6.8 |
| 3,723,803 | 3/1973 | Harrison, III | 315/22 |
| 3,772,658 | 11/1973 | Sarlo | 340/173 R |
| 3,775,005 | 11/1973 | Szabo | 353/42 |
| 3,778,810 | 12/1973 | Hayashi | 340/477 |
| 3,815,095 | 6/1974 | Wester | 340/172.5 |
| 3,816,726 | 6/1974 | Sutherland et al. | 235/152 |
| 3,889,107 | 6/1975 | Sutherland | 235/152 |
| 3,927,396 | 12/1975 | Can | 365/49 |
| 3,942,163 | 3/1976 | Goyal | 340/173 R |
| 3,970,993 | 7/1976 | Finnila | 364/200 |
| 3,988,728 | 10/1976 | Inoue et al. | 340/323 |
| 4,060,713 | 11/1977 | Golay | 364/416 |
| 4,089,063 | 5/1978 | Takezono | 364/200 |
| 4,127,849 | 11/1978 | Okor | 340/324 AD |
| 4,184,206 | 1/1980 | Harano | 364/515 |
| 4,208,719 | 6/1980 | Lotz et al. | 364/515 |
| 4,208,810 | 6/1980 | Rohner et al. | 35/10.24 |
| 4,222,076 | 9/1980 | Knowlton | 358/263 |
| 4,224,600 | 9/1980 | Sellner | 340/146.3 |
| 4,225,929 | 9/1980 | Ikeda | 364/521 |
| 4,231,095 | 10/1980 | Cassagne | 364/515 |
| 4,261,018 | 4/1981 | Knowlton | 358/263 |
| 4,375,638 | 3/1983 | O'Keefe | 340/750 |
| 4,521,773 | 6/1985 | Lyonn | 365/49 |

OTHER PUBLICATIONS

"Two's Complement Pipeline Multipliers," by R. F. Lyon, IEEE Transactions on Communications, vol. CO-M-24, Apr. 1976, pp. 418–425.

Chapter 22, Newman and R. F. Sproull, "Principles of Interactive Computer Graphics", 2nd ed., McGraw Hill, 1979.

(List continued on next page.)

*Primary Examiner*—Archie E. Williams
*Assistant Examiner*—Ayni Mohammed
*Attorney, Agent, or Firm*—Cushman, Darby & Cushman

[57] ABSTRACT

The system provides a relatively inexpensive raster-scan type graphics system capable of real time operation, utilizing logic-enhanced pixels within an image buffer, permitting parallel (simultaneous) calculations at every pixel. A typical implementation would be as custom VLSI chips. Each cell of the image buffer corresponds to a pixel of the display, and a processor at each cell enables calculation of the pixel color and the like for each polygon in the image covering that same pixel (cell) of the display. In the sequence of most general applications, each polygon is operated upon in sequence, and the image is built up as the polygons are processed without the necessity of sorting. With respect to each successive polygon, the following operations are effected: (1) all pixels within the polygon are identified; (2) the respective pixels which would be visible to the observer, that is, not obstructed by some previously processed polygon, are determined; and (3) the proper color intensities for each visible pixel are determined.

13 Claims, 3 Drawing Sheets

OTHER PUBLICATIONS

Chapter 8 of J. D. Foley and H. Vandam, "Fundamentals of Interactive Computer Graphics", Addison-Westley, 1982.

Sutherland et al., "A Characterization of Ten-Hidden Surface Algorithms", Computer Surveys 6(1): Mar. 1, 1974.

Parke: F. I., "Simulation and Expected Performance Analysis of Multiple Processor Z-Buffer Systems", Association for Computer Machinery, Publication No. 0-89791-021-4/80/0700-0048, pp. 46-56.

Weinberg: R., "Parallel Processing Image Synthesis and Anti-Aliasing," Computer Graphics, vol. 15, No. 3, pp. 55-62 (1981).

Whitted; T., "Hardware Enhanced 3-D Raster Display System", pp. 349-356, CMCCS/ACCHO (1981).

IMAGE BUFFER HAVING LOGIC-ENHANCED PIXEL MEMORY CELLS AND METHOD FOR SETTING VALUES THEREIN

This is a division of application Ser. No. 349,818, now U.S. Pat. No. 4,590,465, filed Feb. 18, 1982.

BACKGROUND OF THE INVENTION

1. Field of the Invention

The present invention relates to a graphics display system, and in particular, to raster type graphics display systems.

2. Description of the Prior Art

Graphics display systems are systems for generating images on an electronic display device from a previously generated digital data base. Graphic systems generate two-dimensional images from either two or three dimensional (3-D) object descriptions. The object descriptions are manipulated to provide images of the object as viewed from various defined viewing positions or perspectives. The following description is primarily directed to systems capable of operating upon 3-D object descriptions. Such systems are inherently capable of operation upon 2-D object descriptions. Graphic display systems tend to be of two basic types: vector display (stick figure) systems, and raster-scan video systems. Raster systems, in turn, are generally of two distinct types: real-time digital scene generators (visual simulators) and general purpose image buffer based systems, incapable of real-time image generation. However, the vector type graphics systems are incapable of providing a solid model, and the stick figure images generated tend to be confusing since lines that would normally be hidden by solid portions of the object are visible to the observer.

Examples of such vector systems are Evans & Sutherland Model PS-3000, and Vector General Model 3303. Reference in this regard is also made to U.S. Pat. Nos.: 3,639,736 and 3,684,876 issued to I. Sutherland on Feb. 1, 1972 and Aug. 15, 1982, respectively.

Raster-scan systems, on the other hand, are capable of providing an apparently solid image. Real-time raster-scan systems utilize considerable highly specialized electronic circuits in order to generate a complete image within one image frame scan time (typically one-thirtieth of one second). The less expensive non-real time raster scan systems generally maintain a frame buffer having a respective addressable memory cell associated with each picture element (pixel) of the display device. The display device is typically a cathode-ray tube (CRT) having a 512 by 512 matrix of pixels. To display each scene (frame) of data, the memory matrix is scanned to drive the raster scan of the CRT.

In a standard system, the data base is a description of a world model consisting of one or more objects. Each object is nominally represented by a set of planar polygonal surfaces. Each polygon, in turn, is represented in the data base by the coordinates (x, y, z) of its respective vertices within a chosen coordinate system, and the intrinsic vertex color intensities (red, green, blue). The succeeding vertices in a polygon are provided in a conventional order e.g., counter clockwise.

To generate an image, a particular viewing position in the environment, a viewing direction and a field of view are specified. The processing typically involves translating the coordinates of the vertices into a new coordinate system relating to the specified viewing position and direction, and a clipping process is performed to eliminate portions of the polygon outside of the current field of view. The polygon data is then scaled to provide proper perspective, and transformed (if necessary) into coordinates of the display device.

The above-described calculations may be performed in general purpose or special purpose computers. Various commercial systems which provide the above-described geometric transformations in real time are available, such as the Vector General 3303, or Evans and Sutherland PS-300. For a detailed description of such techniques, reference is made to: Chapter 22 of Newman and R. F. Sproull, "Principals of Interactive Computer Graphics," second edition, McGraw Hill 1979; and Chapter 8 of J. D. Foley and H. VanDam, "Fundamentals of Interactive Computer Graphics," Addison-Westley 1982.

The intrinsic color intensity at each vertex is then modified by a function of the light reflected toward the viewer at the vertex, the direction and distances to light sources, the surface reflectivity and various other factors which may be desired.

A calculation is then performed to determine which pixels in each polygon would be visible to the viewer. For a description of prior art visibility calculation techniques, reference is made to: Sutherland et al, "A Characterization of the Ten-Hidden Surface Algorithms," Computing Surveys 6(1):1 March 1974.

The color intensity values for each pixel are then computed, typically by interpolation from the respective intensity values at the polygon vertices.

The visibility and shading and color computations are exceedingly time consuming in that individual visibility determinations and intensity values must be determined for each of more than 250 thousand individual pixels in the 512 by 512 matrix. Accordingly, the real time digital scene generation systems (capable of providing real time operation) are exceedingly expensive.

SUMMARY OF THE INVENTION

The present invention provides a relatively inexpensive raster-scan type graphics system capable of real time operation, utilizing logic-enhanced pixels within the image buffer, permitting parallel (simultaneous) calculations at every pixel. A typical implementation would be as custom VLSI chips. The system can effect various processing sequences. In the sequence of most general applications, each polygon is operated upon in sequence, and the image is built up as the polygons are processed without the necessity of sorting. With respect to each successive polygon, the following operations are effected: (1) all pixels within the polygon are identified; (2) the respective pixels which would be visible to the observer, that is, not obstructed by some previously processed polygon, are determined; and (3) the proper color intensities for each visible pixel are determined.

Each of the aforementioned operations is performed simultaneously (i.e. in parallel) for each pixel in the polygon, utilizing what may be termed an enhanced memory cell associated with each pixel. Further processing circuit efficiencies are achieved by using a single circuit for all of the above noted operations. This is made possible by use of a representation method amenable to all three operations, namely the value of a variation of the expression $F(x,y) = Ax + By + C$, is calculated for each pixel memory cell were x, y are the coordinates of the pixel in the image. Further, processing and space efficiencies are realized by the capability of the system to calculate the expression without necessitating the x,y address to be explicitly specified in any location. The special purpose computer calculates the respective coefficients for the various equations, and signals indicative of the coefficients are applied to what may be termed serial multiplier trees. The multiplier trees generate values for Ax,By and C for every value of x, and every value of y in the pixel matrix. The respective Ax, and By and C values are combined in the individual enhanced memory cells corresponding to the x and y values.

BRIEF DESCRIPTION OF THE DRAWINGS

A preferred exemplary embodiment will hereinafter be described in conjunction with the appended drawings wherein like numerals denote like elements and.

DESCRIPTION OF THE PREFERRED EXEMPLARY EMBODIMENTS

Figure 1:
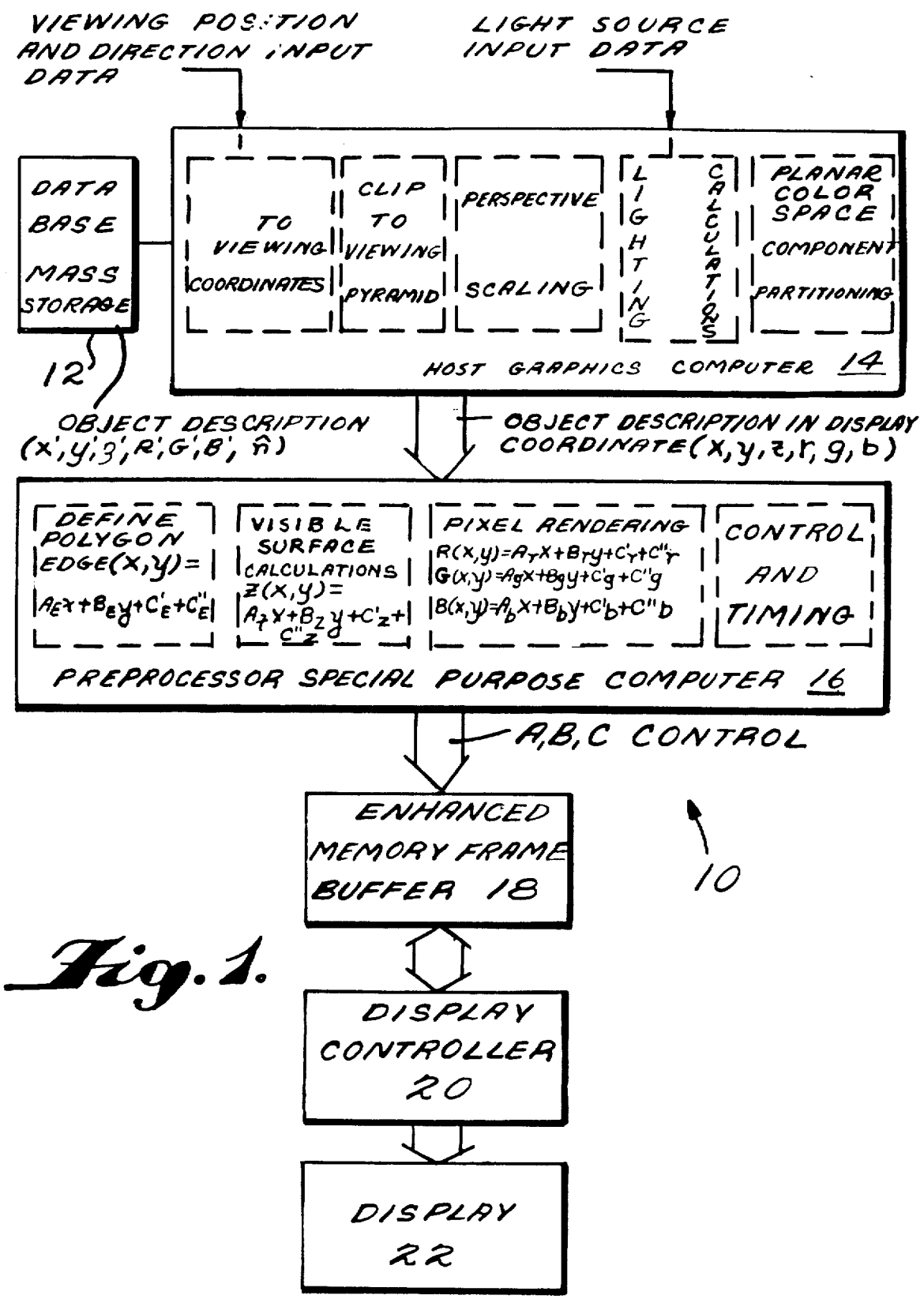
FIG. 1 is a schematic block diagram of a graphics display system in accordance with the present invention.

Referring now to FIG. 1, a graphics system 10 in accordance with the present invention comprises a suitable mass storage device 12, a suitable host graphics computer 14, a preprocessor computer 16, an enhanced memory frame buffer 18, a conventional display controller 20, and a conventional display device 22.

Mass storage device 12 may be a separate conventional magnetic disk device or can be an integral part of host graphics computer 14, i.e., the main memory of computer 14. Mass storage device 12 contains a previously generated data base comprising a digital representation of the world model. As previously noted, the objects in the model are nominally divided into a plurality of convex polygonal surfaces having arbitrary numbers of sides. The respective polygons are represented in the data base as a sequence of data words each corresponding to a vertex of the polygon. By convention, the vertices of the polygon are sequenced in, for example, a counter-clockwise direction within the data group. A one bit flag in the corresponding data word is utilized to indicate the last vertex.

Each vertex data word suitably comprises a plurality of fields representing the coordinates of the vertex in a chosen coordinate system (x', y', z'), the intrinsic color intensities present at the vertex (R', G', B'), and a vector indicating the unit normal to the polygon surface at the vertex.

Host computer 14 may be a standard general purpose computer, such as a DEC VAX 11/780. Preferably host computer 14 is a special purpose device utilizing an AMD 2900 family integrated circuit and TRW monolithic multipliers. In general, host computer 14 receives control input data from a user defining a particular viewing position and direction (i.e. viewpoint), and any light sources to be considered, and translates the base data from mass storage 12 into a display coordinate system defined in accordance with the perspective of the viewing position and light sources. In other words, host graphics computer 14, in effect, converts the data base into a description of the object in "display coordinates" and provides a sequence of data words representing the vertices of respective sequential convex polygons in the display coordinate system. Each vertex data word (x, y, z, R, G, B) suitably comprises a x field; a y field, a z field, a R field, a G field, and a B field, representing the x, y and z coordinates of the vertex in display coordinate system and the intrinsic red, green and blue intensity values at the vertex.

If desired, host graphics computer 14 can also operate to ensure that each polygon represents a plane in color space. In its most basic form, such operation can be accomplished by breaking each N-sided polygon into (N-2) triangles, each sharing a common vertex (the first vertex processed). The basic approach may, however, require operation by the system upon a larger than necessary number of polygons (triangles). Accordingly, it is desirable to break the respective polygons into a few component polygons as possible. This can be accomplished by determining the equation for the plane of the first triangle in color space i.e. R,G,B, as will be hereinafter explained, then inserting the data values of the respective successive vertices, in sequence, to determine if they conform with the calculated equation. If the data associated with a successive vertex conforms to the equation, the vertex is included in the planar polygon. If the vertex data does not conform to the planar equation, a new component polygon is nominally formed and the computation repeated in respect of the new component polygon.

Successive groups of vertex data words from host graphics computer 14 representing a successive polygon are applied to and stored in special purpose preprocessor computer 16. Preprocessor 16 and enhanced memory frame buffer 18 then cooperate to generate appropriate data signals to display controller 20, which in turn drives standard display device 22, suitably a cathode ray tube. For each successive polygon, all pixels within the polygon are first identified. Those of the pixels within the polygon which would be visible to the observer (i.e. not obstructed by some previously processed polygon) are then determined. The proper color intensities (R, G, B) for each unobstructed pixel in the polygon are establised in the corresponding memory cells. The process is repeated for each polygon in the frame (scene), and the ultimate result selectively provided to display controller 20 to drive display 22.

Preprocessor 16 is suitably a special purpose or general purpose computer capable of computing the values of the coefficients in a number of variations of the expression $F(x,y) = Ax + By + C$ from the vertex data groups, where x and y correspond to the x and y coordinates of a respective pixel in the display coordinate system. The C coefficients, for convenience, may be divided into two portions, C' and C", where $C' + C'' = C$. The values of the coefficients are applied to enhanced memory 18, which calculates, in parallel, the value of F(x,y) for each x,y pair in the display. More particularly, after the display coordinate vertex data for a polygon is applied to preprocessor 16, preprocessor 16 and enhanced memory 18 cooperate to determine, with respect to each pixel in the display coordinate system, whether or not the pixel is within the interior of the polygon. All exterior pixels are, in effect, disabled with respect to further processing of the particular polygon data group. Preprocessor 16 successively calculates, from the vertex data, the coefficients of "edge" equations representing the lines connecting successive vertices of the polygon. The edges of the polygon, i.e. lines between successive vertices, can be represented by the equation:

$$EDGE(x,y) = A_E x + B_E y + C_E + C'_E \quad (1)$$

The coefficients A, B, C of EDGE(x,y) are calculted by taking the differences in the x and y values for successive vertices. Assuming the polygon to be traversed in a counter clockwise direction, with respect to successive vertices $(x_i, y_i)$ and $(x_{i+1}, y_{i+1})$:

$$-(y_{i+1}-y_i)x + (x_i - x_{i+1})y + (y_{i+1}-y_i)x_i - (x_{i+1}-x_i)y_i = 0 \quad (2)$$

Thus;

$$A_E = -(y_{i+1} - y_i) \quad (3)$$

$$B_E = (x_{i+1} - x_i) \quad (4)$$

$$C'_E = -x_i A_e \quad (5)$$

$$C''_E = -y_i B_E \quad (6)$$

The coefficients for the edge are provided to enhanced memory 18, which calculates the value of the edge equation for each pixel, in parallel, and inhibits all pixels on the exterior side of the line (Edge (x,y)>0). Such operation is repeated for each edge in sequence, thus inhibiting all pixels on the exterior of the polygon with respect to further processing until reception of the next successive polygon data group.

The pixels within the polygon which would be obstructed to the viewer by a previously processed polygon are then determined and inhibited. Processor 16 calculates, from the vertex data, the coefficients of the planar equation for the polygon in z space.

$$Z(x,y) = A_z x + B_z y + C_z + C'_z \quad (7)$$

The equation is determined by calculating a plane which passes through a given point, i.e. (x, y, z) and is perpendicular to the line defined by the vector product of the first two directed line segments in the polygon. Where the first three successive vertices in the polygon are $(x_1, y_1, z_1)$, $(x_2, y_2, z_2)$ and $(x_3, y_3, z_3)$, the vector product is represented as follows:

| X | Y | Z |
|---|---|---|
| $(x_2-x_1)$ | $(y_2-y_1)$ | $(z_2-z_1)$ |
| $(x_3-x_2)$ | $(y_3-y_2)$ | $(z_3-z_2)$ |

The vector product described a line with direction numbers a, b, c, where $$a = (y_2-y_1)(z_3-z_2) - (y_3-y_2)(z_2-z_1) \quad (9)$$

$$b = (z_2-z_1)(x_3-x_2) - (z_3-z_2)(x_2-x_1) \quad (10)$$

$$c = (x_2-x_1)(y_3-y_2) - (x_3-x_2)(y_2-y_1) \quad (11)$$

The equation of the plane perpendicular to that line which passes through the first vertex, $x_1, y_1, z_1$ is therefore represented by:

$$Z(x,y) = (-a/c)x + (-b/c)y + (a/c)x_1 + (b/c)y_1 + z_1. \quad (12)$$

Thus, coefficients $A_z$, $B_z$, $C'_z$ and $C''_z$ are as follows:

$$A_z = -a/c \quad (13)$$

$$B_z = -b/c \quad (14)$$

$$C'_z = (a/c)x_1 = -A_z x_1 \quad (15)$$

$$C''_z = (b/c)y_1 + z_1 = -B_z y_1 + z_1 \quad (16)$$

The coefficients of z(x,y) are applied in serial form to enhanced memory 18, where the value of z(x,y) is calculated in parallel for each pixel. As will be explained, the calculated value is compared to a lowest previous z function value stored in the pixel. If the stored previous value is less than the newly computed z value in a given pixel, it is an indication that the point in the polygon (i.e. the pixel) is obstructed from the particular view point of interest by a previously processed polygon. The hidden pixel memory cell is accordingly disabled until the next polygon is processed and its previous contents maintained. Thus, the pixel memory cell retains indicia of the color intensities associated with the particular polygon closest to the observer (and thus visible to the observer).

A color rendering of the unobstructed pixels in the polygon is then effected. Preprocessor 16 calculates, in sequence, the planar equations for the red, green, and blue intensity planes, in a manner essentially identical to the derivation of the z plane equation.

Serial representations of the red, green and blue coefficients are applied to enhanced memory 18 in sequence. Enhanced memory 18 calculates, in parallel, intensity values for each particular pixel, and stores such values in respect of those pixels which have not previously been disabled, replacing the previous contents. Thus, when all polygons in a frame have been processed, the respective pixels contain indica of the proper color intensities for the corresponding points in the display.

Figure 2:
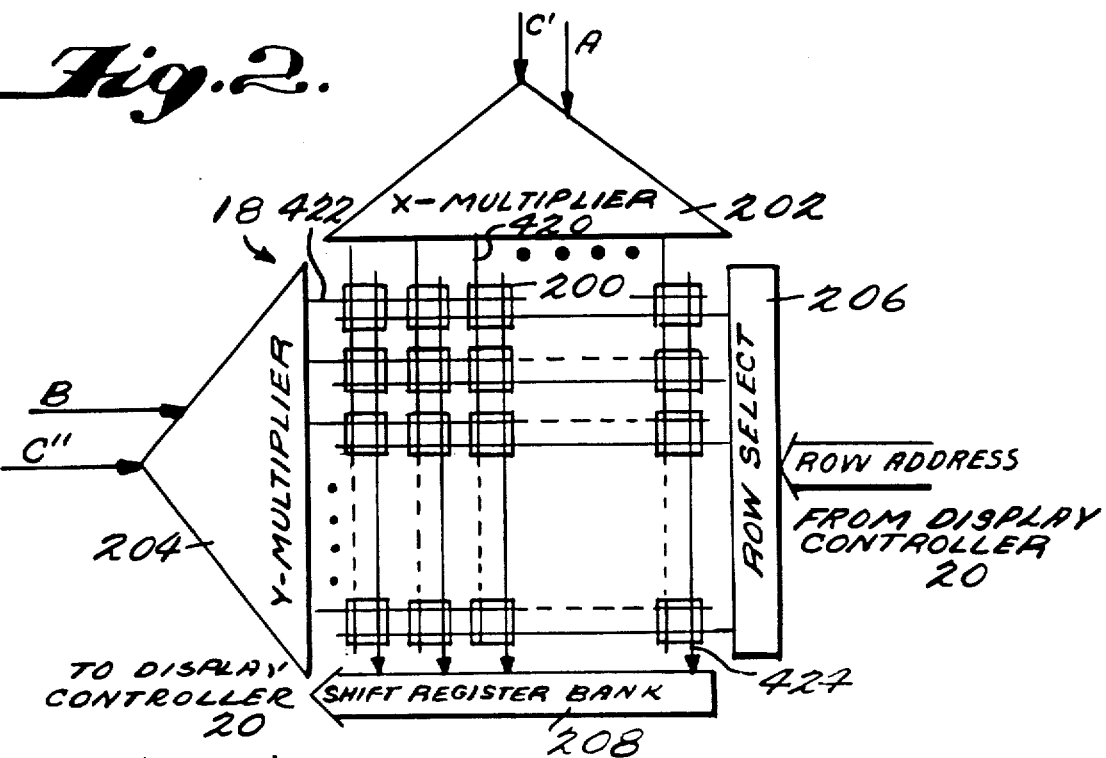
FIG. 2 is a block diagram of an enhanced memory in accordance with one aspect of the present invention.

Enhanced memory 18 will now be described with reference to FIGS. 2, 3, and 4. Referring to FIG. 2, enhanced memory 18 comprises an array of individual enhanced memory cells 200, cooperating with respective multiplier trees 202 and 204, suitable row selection decoder logic 206, and a bank of serial input/parallel-output shift registers 208. Multipliers 202 and 204 will be hereinafter more fully described in conjunction with FIG. 3, and enhanced memory cells 200 will hereinafter be more fully described in conjunction with FIG. 4.

Briefly, the respective A and C', and B and B" coefficient values computed by preprocessor 16 are applied, on a bit serial basis, to X multiplier 202 and y multiplier 204, respectively. X multiplier 202 and y multiplier 204 generate a separate output signal corresponding to Ax+C" for each value of x in the display coordinate system, and By+C" for each value of y in the display coordinate system, respectively. Each output of X multiplier 202 is coupled to the cells 200 in a respective nominal associated column of cells. Similarly, each output of y multiplier 204 is coupled to the cells 200 in a respective associated nominal row of cells.

Cells 200 are also coupled to shift register bank 208. Output signals from a designated row of cells are applied to a respective portion of shift register bank 208 in response to appropriate command signals from row select decoder 206.

Figure 3:
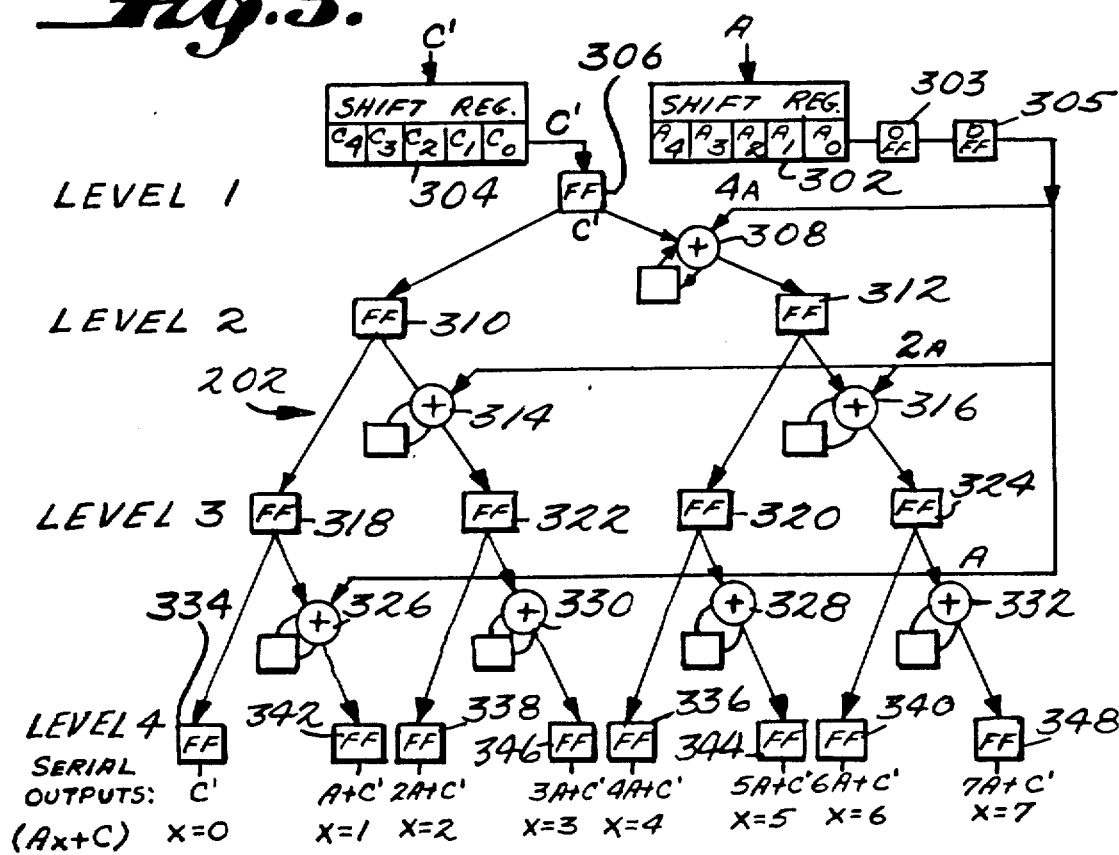
FIG. 3 is a schematic block diagram of a serial multiplier tree in accordance with one aspect of the present invention.

Referring now to FIG. 3, x multiplier 202 and y multiplier 204 will be described. For convenience of explanation, only x multiplier 202 will be specifically described. Y multiplier 204 is essentially identical except as to the coefficients applied thereto and output connections.

In general, multiplier tree 202 comprises a series of levels of simultaneously clocked storage elements (e.g. flip flops) and one bit adders with carry. The output of each flip flop is applied an an input to another flip flop nominally in the next successive level, and as one input to the adder. The output of each adder is applied to another flip flop nominally in the next successive level, and so forth. The first flip flop is receptive of a sequence of bits representing the C' coefficient (C" for y multiplier 204). The second input of each of the respective adders is receptive of a series of bits indicative of the A coefficient (or B coefficient in the case of y multiplier 204), delayed by a number of bit periods equal to one less than the number of storage element/adder levels in the tree.

More specifically, the indica of the A coefficient and C' coefficient are loaded into respective shift registers 302 and 304. Registers 302 and 304, may be, if desired, integral to preprocessor 16. The C coefficient is applied by register 304, in a bit serial fashion, to a flip flop 306 in the nominal first level. The output of flip flop 306 is coupled to one input of a one bit adder with carry 308 the output of which is applied to a flip flop 312 nominally in the second level. The output of flip flop 306 is also applied to the input of a flip flop 310 in the nominal second level. The outputs of flip flops 310 and 312 are applied to one input of respective one bit adders with carry (314 and 316) and to respective flip flops (318 and 320) nominally in a third level. The outputs of adders 314 and 316 are applied to further flip flops 322 and 324, respectively, in the third level. Flip flops 318, 320, 322 and 324 are, in turn, coupled to one bit adders with carry 326, 328, 330 and 332, respectively, and to flip flops 334, 336, 338 and 340, respectively, in a fourth level. Adders 326, 328, 330, and 332 are similarly coupled to flip flops 342, 344, 346 and 348 in the fourth level.

The A coefficient is delayed by a number of bit periods equal to one less than the number of levels in the tree by interposition of an appropriate number of storage elements (303,305) after shift register 302. The delayed A coefficient is serially applied to the second input of each of the respective one bit adders. For ease of illustration, only three (and a portion) storage element/adder levels of the multiplier tree are shown, producing output signals corresponding to $Ax+C$ for $x=0$ through $x=7$. In practice, the multiplier tree includes sufficient levels (typically 9) to provide an output corresponding to each value of the x coordinate in the display (typically 0–511).

Multiplier tree 202 provides, after a sufficient number of bit periods for the data to traverse the multiplier tree, a serial representation of the sum $Ax+C'$ for each value of x in the display array, e.g. $x=0$ through $x=511$. More particularly, recalling that delaying the serial representation of a coefficient by a bit period is equivalent to multiplying the value of the coefficient by 2, shift register 302 provides, through interposed flip flops 303 and 305, a serial signal indicative of $2^{n-1}A$, where n equals the number of levels in the array. In the illustrated embodiment, a three level tree is shown. Accordingly, a serial signal indicative of 4A is applied to each adder in the tree, e.g. adder 308, 314, 316, 326, 328, 330 and 332.

Since multiplier tree 202 is a pipelined structure, the output signals are necessarily delayed with respect to the input signals. Accordingly, utilization of the output signals is not intitiated until an appropriate number of bit periods after the initial application of the input signal bits to the tree. Elemental delays within the multiplier tree are therefore ignored.

Accordingly, flip flop 306 and adder 308 generate serial signals indicative of C and $C+4A$, respectively. Flip flops 310 and 312 and adders 314 and 316, thus generate serial representations of C, $(4A+C)$, $(2A+C)$ and $(6A+C)$ respectively. Flip flops 318, 322, 320 and 324 therefore generate serial representations of C, $2A+C$; $4A+C$; and $6A+C$, respectively. Adders 326, 330, 328 and 332, generate serial representation of $A+C$, $3A+C$, $5A+C$ and $7A+C$, respectively. Thus, flip flops 334, 342, 338, 346, 336, 344, 340 and 348 generate serial representations of C, $A+C$, $2A+C$, $3A+C$, $4A+C$, $5A+C$, $6A+C$ and $7A+C$, respectively.

Referring again to FIG. 2, as will hereinafter be more fully explained, each of the output signals of x multiplier 202 is coupled to the respective pixel memory cells 200 having an x coordinate corresponding to the x value of the output signal. Similarly, each output of y multiplier 204 is coupled to each memory cell having a y coordinate corresponding to the y value of the output signal. The enhanced memory cells 200 combine the signals from x and y multiplier trees 202 and 204 to determine the value of $F(x,y)$ for the particular pixel's coordinates, and under the control of preprocessor 16, effect predetermined operations on the calculated function value.

Figure 4:
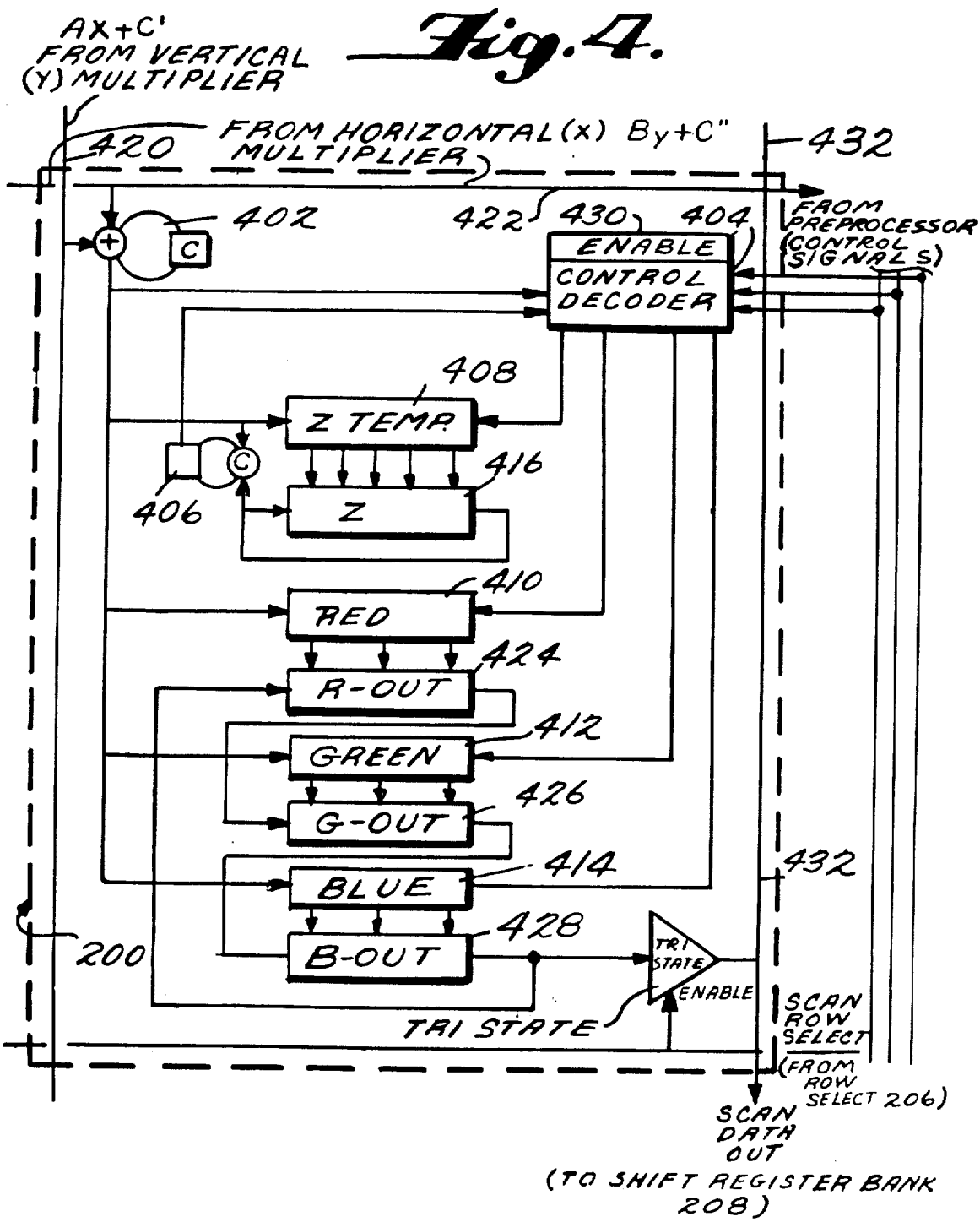
FIG. 4 is a schematic block diagram of an individual enhanced memory cell in accordance with one aspect of the present invention.

Referring now to FIG. 4, each enhanced memory cell 200 suitably comprises a one-bit adder 402 with carry bit having the respective associated serial representation of $Ax+C'$ and $By+C''$ from multiplier trees 202 and 204 applied as the input signals thereto (where x and y are the x and y coordinates of the particular memory cell).

The output of adder 402 is applied to suitable control decoder logic 404, a comparator 406, and respective storage locations (registers) 408, 410, 412 and 414, sometimes hereinafter referred to as the Z temp register 408, red register 410, green register 412 and blue register 414.

As will hereinafter be explained, Z temp register 408 provides temporary storage for calculated values of $Z(x,y)$. Registers 410, 412 and 414 store the respective intensity values $R(x,y)$, $G(s,y)$, respectively and $B(x,y)$. Z temp register 408 communicates, in parallel, with a register 416, hereinafter sometimes referred to as the Z register 416. Z register 416 provides a second input to comparator 406, and the output of comparator 406 is provided to control decoder 404. As will be explained, Z register 416 is utilized for storing indicia of the lowest z value processed for the pixel.

Red register 410, green register 412 and blue register 414 communicate in parallel with shift registers 424, 426 and 428, respectively (sometimes hereinafter referred to as R-out register 424, G-out register 426 and B-out register 428). R-out register 424, G-out register 426 and B-out register 428 are interconnected to, in effect, form a single parallel-in-serial out shift register to convert the pixel data to serial signals for transfer to shift register bank 208 (and thereafter to display controller 20 and display device 22). If desired, the serial output of B-out register 428 can be applied as a serial input to R-out register 424 to, in effect, form a circular shift register. Thus, the pixel data is retained in the composite output shift register (424, 426 and 428) until the next successive image values R, G, B are completed and thereafter loaded in parallel into the output shift register 208.

Control signals to registers 408, 410, 412, 414, and shift registers 424, 426 and 428 are provided by control decoder 404 (Signal path to shift registers not shown). Control decoder 404, receives command code signals (e.g. op-code signals) from preprocessor 16, and responsively generates a control signal at a selected output terminal thereof for application to the appropriate device in the memory cell. Control decoder 404 also includes an enable flag, i.e. flip flop, 430.

The operation of system 10 will now be more fully described with reference to FIGS. 1, 2 and 4. Upon system power up, (and thereafter, upon beginning of processing of a new image), an appropriate control signal is generated by host graphics computer 14 to preprocessor 16. Preprocessor 16, in turn, generates a "preset" control signal and applies the signal to each of the individual memory cells 200 in enhanced memory 18. The "preset" control signal is applied to the control decoder 404 in each cell, which generates an appropriate control signal to Z register 416 to cause register 416 to preset to indicia of the most distant value in the coordinate system, e.t., all ones. Preprocessor 16 then generates indicia to host graphics computer 14 that it is ready to accept the first polygon data set.

Host graphics computer 14 then transmits the respective vertex data words corresponding to the first polygon of the frame to preprocessor 16, which temporarily stores the data words. Upon reception of the polygon vertex data, preprocessor 16 generates a "set enable" control signal to each memory cell 200 in enhanced memory 18. The enable control signal is applied to the control decoder 404 in each memory cell 200, which responsively sets enable flip flop 430.

Preprocessor 16 then calculates the coefficients $A_E$, $B_E$, $C'_E$ and $C''_E$ of the function EDGE (x,y) as previously described. The $A_E$ and $C'_E$ coefficients are applied to x multiplier tree 202 and the $B_E$ and $C''_E$ coefficients are applied to y multiplier 204. X Multiplier 202 and y multiplier 204 generate a plurality of signals $A_Ex+C'_C$ and $B_Ey+C''_E$, respectively, for each value of x and y in the memory cell array of enhanced memory 18. The $A_Ex+C'_E$ signals are applied to each memory cell 200 in the column of cells having the corresponding x value. Similarly, each $B_Ey+C''_E$ signal are applied to each memory cell 200 in the row having the corresponding y values. More particularly, with specific reference to FIG. 4, the corresponding $A_Ex+C'_E$ signal from x multiplier 202 is applied on line 420 as an input signal to the adder 402 of each of the memory cells in the nominal column of the cells. Similarly, the corresponding $B_yE+C''_E$ signal is applied on line 422 as th other input to the adder 402. Adder 420 thus generates a serial signal indicative of $A_Ex+B_Ey+C'_E+C''_E$. EDGE (x,y) is chosen such that the value is less than or equal to zero for all pixels having coordinates (x,y) on the interior side of the line, and positive for all pixels having coordinates (x,y) on the exterior side of the line. Accordingly, after the value of EDGE (x,y) is calculated, indicia of the sign of the value is provided at the output of adder 402 (a low logic level when the value is positive and a high logic value when negative). A logic AND function is then performed on the output bit of adder 402 and the contents of enable flip flop 430 (hardware not shown) The results of the AND function are then loaded into enable flip flop 430. Thus, if the coordinates of bit cell 200 are on the exterior side of the edge (the pixel is thus not within the polygon), enable flip flop 430 is, in effect, reset to zero. However, if the x,y coordinates of the cell are on the interior side of the edge, and the cell has not already been disabled, the enable bit 430 remains set. The above described process is repeated for each of the polygon edges in sequence. Accordingly, after all of the edges have been so processed, only the pixels having coordinates corresponding to those within the polygon remain enabled.

Preprocessor 16 then calculates the coefficients of the z plane of the polygon as previously described. The coefficients are applied to multiplier trees 202 and 204 which generate the respective serial representations of $A_zx+C'_z$ and $B_zy+C''z'$ respectively. The corresponding $A_zx+C'_z$ and $B_zy+C''_z$ signals are applied to adder 404 in each of the cells 200, and the resultant sum developed and stored in Z-temp register 408.

The newly calculated value for z(x,y) (stored in z temp register 1408) is compared by comparator 402 to contents of z register 416 (initially all one). If the newly calculated z value is greater than the previously stored contents of the Z register, the polygon at that point (pixel) is farther away from the viewing position than some previously processed polygon encompassing the same pixel (x,y coordinate). Accordingly, that portion of the polygon (the particular pixel) is obstructed by the previously processed polygon, and is thus hidden from the designated view point. Enable flip flop 430 is therefore cleared by the output of comparator 406 and the cell is inhibited with respect to further processing of the particular polygon. However, if the newly calculated z value is less than the contents of the Z register 416, the pixel is unobstructed with respect to the designated viewpoint by any prevously procesed polygon. Accordingly, the newly calculated z value (in Z-temp register 480) is loaded in Z register 416, replacing its previous contents and the enable bit 430 remains set.

In practice, the comparison step may be accomplished on a bit by bit basis as the new z value is accumulated. More specifically, the output of adder 402 is applied to comparator 406. The contents of Z register 416 are similarly serially applied to the other input of comparator 406. Comparator 406 suitably comprises a one bit subtractor. A bit serial subtraction of the contents of Z register 430 from the newly computed Z value is thus effected. At the conclusion of the computation, the borrow bit of the subtractor is indicative of the results of the comparison, and is applied to control decoder 404 to effect the appropriate action. As should be appreciated, the comparison can in fact be accomplished usng only the borrow circuitry of the subtractor.

Preprocessor 16 then computes the coefficients for one of the color intensity planes r(x,y), g(x,y) or b(x,y). The coefficients are applied to multiplier trees 202 and 204 which generate the various $Ax+C'$ and $By+C''$ signals. The appropriate $Ax+C'$ and $By+C''$ signals are applied to the adder 402 of each the enhanced memory cells 200. The resultant sum is applied to the corresponding registers 410, 412 or 414. However, the sum signal is accepted and stored only in those cells which are still enabled. This process is repeated for each of the red, blue and green intensities.

The overall process is repeated for each of the polygons in the frame. Thus, at the end of the frame, the R, G and B registers 410, 412 and 414 of each cell 200 contain the intensity values seen at the corresponding pixel coordinates from the designated viewpoint. Accordingly, at the end of the frame, an appropriate control signal is generated by host graphics computer 14 to preprocessor 16, which in turn generates the appropriate control signal to each of the memory cells 200, causing the contents of registers 410, 412 and 414 to be loaded into shift registers 424, 426 and 428. The next frame of red, blue and green data is then accessed by host graphics computer 14 from storage 12, and the above process repeated.

Raster-like readout of the memory cells is effected to provide control signals to display controller 20. Display controller 20 sequentially generates address control signals to row select logic 206. Row select logic 206 generates an output shift register seerial mode enable signal to shift registers 424, 426 and 428 of each cell in the nominal row of cells (all cells corresponding to pixels having a particular y coordinate).

The contents of the respective cumulative shift registers 424, 426 and 428 are then serially output on column data line 432 to shift register bank 208. Shift register bank 208 then transfers the data, pixel by pixel, to display controller 20 to effect control of display 22. Typically, serial input to shift register bank 208 from the respective cells is effected during the horizontal blanking interval of the raster scan. The output of shift register bank 208 occurs during actual raster line scan.

If desired, in view of bandwidth constraints, the respective columns of cells can be nominally divided into a plurality of groups. The groups are chosen so that each group contains respective columns which are maximally displaced in relative position in the image. Data from corresponding cells in each group are concurrently transmitted to respective portions of shift register bank 208 utilizing wide band parallel data paths. The output of the respective portions of shift register 208 are multiplexed to form the data sent to controller 20.

It should be appreciated that system 10 can also be utilized with direct readout, as opposed to raster scan type displays such as, for example, a liquid crystal display. In such case, each memory cell would be directly connected to the input of the corresponding display cell. The display cells are preferably physically disposed overlying the associated memory cell. Many of the provisions for sequential outputting of the cells would not be necessary and can therefore be omitted from enhanced memory 18.

It will be understood that the appended drawings are block schematic in nature, and that various control signal paths and the like are not shown. Further, while various of the conductors/connectons are shown in the drawings as single lines, they are not so shown in a limiting sense and may comprise plural conductors/-connections as is understood in the art. Moreover, the above description is of preferred exemplary embodiments of the present invention and the invention is not limited to the specific form shown. Modifications maya be made in the design and arrangement of the elements without departing from the spirit of the invention as expressed in the appended claims.

What we claim is:

1. An image buffer for a graphics display apparatus which displays an image formed from an inputted image description representing a plurality of component surfaces of said image as intensity and depth values of respective pixels, said image buffer having a plurality of data storage cells and means for transmitting at least said intensity and depth values of said respective pixels to each of said plurality of cells, each data storage cell comprising:
   storing means for storing said transmitted intensity and depth values of said respective pixels;
   comparing means for comparing at least one currently transmitted depth value of said respective pixels from said value transmitting means with a depth value of said respective pixels which has been previously stored in said storing means to determine whether the component surface having said currently or previously transmitted depth value is closest to a viewer of said image;
   enable bit means for selectively disabling said cell when said comparing means determines that the currently transmitted depth value is not closest to the viewer; and
   control means, responsive to outputs of said value transmitting means and said comparing means, for controlling said value transmitting means to successively transmit at least one further tensity value of said respective pixels to each of said cells and for controlling said storing means in those cells not disabled by said enable bit means to store said further intensity value of said respective pixels.

2. An image buffer as in claim 1 wherein:
   said plurality of cells are arranged in a matrix having at least first and second coordinate directions; and
   said value transmitting mans includes means for applying at least signals indicative of said intensity and depth values of said respective pixels to each of said coordinate directions of said matrix.

3. An image buffer as in claim 2 further including adding means at each of said cells for combining at least two of the signals applied to said matrix.

4. An image buffer as in claim 1 wherein said value transmitting means includes:
   means for producing a plurality of signals indicative of said intensity and depth values of said respective pixels; and
   means for applying at least said plurality of signals to said plurality of cells, each cell being connected so as to receive a different combination of said plurality of signals.

5. An image buffer as in claim 4 further including adding means at each of said cells for combining the signals applied thereto from said signal applying means.

6. A method of setting values in data storage cells of a matrix memory of an image buffer for a graphics display apparatus which displays an image formed from an inputted image description representing a plurality of component surfaces of said image as intensity and depth values of respective pixels, said image buffer being enhanced by processing means in each data storage cell thereof, and said processing means including at least a plurality of storage registers, comparison means for comparing at least one currently transmitted depth value of said respective pixels with a depth value previously transmitted and stored in said plurality of storage registers, and means for selectively enabling and disabling said data storage cell, said method comprising the steps of:
   (1) transmitting a depth value of said respective pixels to a plurality of said data storage cells for each coordinate direction of said matrix;
   (2) at each data storage cell, comparing said depth value of said respective pixels with a depth value previously stored in said data storage cell to determine whether the component surface having said previously stored or said transmitted depth value is closest to a viewer of said image;

(3) at each data storage cell, selectively disabling said data storage cell in response to said comparison when it is determined that said transmitted depth value is not part of a component surface closest to the viewer of said image;

(4) transmitting an intensity value of said respective pixels to said plurality of data storage cells;

(5) storing at least said intensity value of said respective pixels transmitted by said transmitting step (4) in a storage register of each enabled data storage cell; and (6) repeating said transmitting and storing steps (4) and (5) so as to introduce at least said intensity values of said respective pixels into a next enabled one of said storage registers until all said registers are set in accordance with said intensity and depth values of said respective pixels transmitted thereto.

7. A method as in claim 6 further including the preliminary step of enabling said plurality of data storage cells.

8. A method as in claim 6 further including the steps of:
before said transmitting step (1), enabling each of said data storage cells; and
repeating said steps (1), (2), (3), (4), (5) and (6) for a plurality of sets of intensity and depth values of said respective pixels.

9. A method as in claim 6 further including the step of calculating, in each of said enabled data storage cells in response to said transmitted intensity value of said respective pixels, an intensity of a display element corresponding to said data storage cell.

10. A method as in claim 6 wherein:
said transmitting steps (1) and (4) each include the steps of:
producing a plurality of signals indicative of said intensity and depth values of said respective pixels, and
applying a different combination of said plurality of signals to each of said plurality of data storage cells; and
said method further includes the step of combining, at each of said plurality of data storage cells, the signals applied thereto so as to obtain said transmitted intensity and depth vaues of said respective pixels.

11. A method as in claim 6 further including the step of:
defining a viewing plane, each of said plurality of data storage cells in said matrix memory representing a predetermined point on said viewing plane.

12. A method of setting values in data storage cells of a matrix memory of an image buffer for a graphics display apparatus which displays an image formed from an inputted image description representing a plurality of component surfaces of said image as inftensity and depth values of respective pixels, said image buffer being enhanced by processing means in each data storage cell thereof, and said processing means including at least one storage register, comparison means for comparing at least one currently transmitted depth value of said respective pixels with a depth value previously transmitted and stored in said at least one storage register, and means for selectively enabling and disabling said data storage cell, said method comprising the steps of:

(1) enablaing each of the data storage cells;

(2) transmitting a depth value of said respective pixels to said data storage cells;

(3) at each data storage cell, comparing said depth value of said respective pixels with a depth value previously stored in said data storage cell to determine whether the component surface having said previously stored or said transmitted depth value is closest to a viewer of said image;

(4) at each data storage cell, selectively disabling said data storage cell in response to said comparison when it is determined that said transmitted depth value is not part of a component surface closest to the viewer of said image;

(5) transmitting an intensity value of said respective pixels to said data storage cells;

(6) storing at least said intensity value of said respective pixels transmitted in said transmitting step (5) in said at least one register of each enabled data storage cell; and (7) repeating steps (1) through (6) for a plurality of sets of intensity and depth values.

13. A method as in claim 12 wherein:
said transmitting steps (2) and (5) each include the steps of:
transmitting a first component value via a first multiplier for a first coordinate direction of a matrix, and
transmitting a second component value via a second multiplier for a second coordinate direction of said matrix; and
wherein said method further includes the steps of:
combining, after said transmitting step (2) and before said disabling step (4), at each data storage cell, said transmitted first and second components to obtain said depth value, and
combining, after said transmitting step (5) and before said storing step (6), at each data storage cell, said transmitted first and second components to obtain said intensity value.

* * * * *